W. KAHL.
SUPPORTING DEVICE.
APPLICATION FILED JAN. 10, 1919.
1,333,258. Patented Mar. 9, 1920.
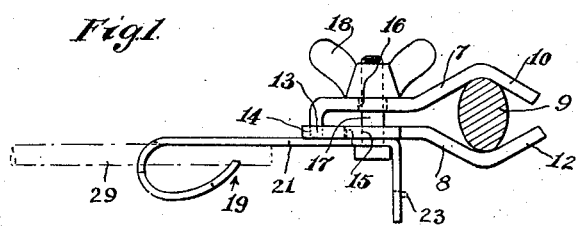
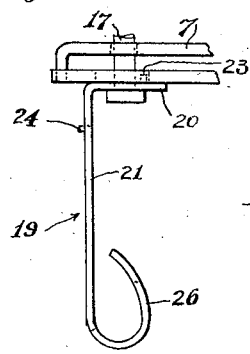
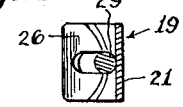
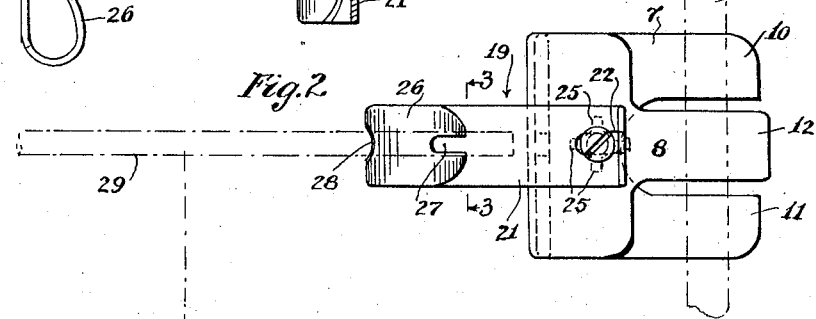
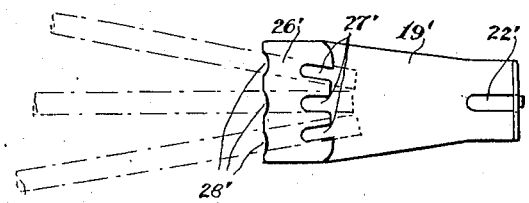
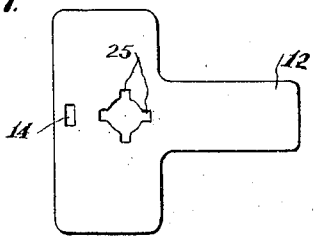
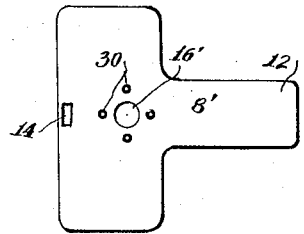
Inventor:
William Kahl
By his Att'y
Gustav Drews

UNITED STATES PATENT OFFICE.

WILLIAM KAHL, OF BROOKLYN, NEW YORK.

SUPPORTING DEVICE.

1,333,258. Specification of Letters Patent. Patented Mar. 9, 1920.

Application filed January 10, 1919. Serial No. 270,494.

*To all whom it may concern:*

Be it known that I, WILLIAM KAHL, a citizen of the United States, residing in Brooklyn, county of Kings, and State of New York, have invented certain new and useful Improvements in Supporting Devices, of which the following is a specification.

This invention relates to supporting devices in general and more especially to brackets for supporting small flags and the like.

Among the main objects of the present invention, it is aimed to provide a supporting bracket which can with great facility be secured to a frame or a hood of an automobile or the like.

Still another object of the invention is to provide a supporting bracket which is adjustable to secure the flag at various angles relative to the supporting bracket, and to the frame or hood to which the bracket is secured.

A further object of the invention is to provide such a supporting bracket in which but a single element is required to be tightened to secure the device in place.

These and other features, capabilities and advantages of the invention will appear from the subjoined detail description of certain specific embodiments thereof illustrated in the accompanying drawing in which—

Figure 1 is a side elevation of one embodiment of the device.

Fig. 2 is a bottom plan view of the same.

Fig. 3 is an end elevation of a portion of the embodiment illustrated in Fig. 1.

Fig. 4 is a side elevation showing an adjustment of the several parts different than that illustrated in Fig. 1.

Fig. 5 shows a modified form of one of the elements of the device detached.

Fig. 6 is a detached plan view of one of the plates for coöperating with the modified element shown in Fig. 5.

Fig. 7 is a plan of one of the plate members of the embodiment illustrated in Fig. 1.

In the embodiment illustrated in Figs. 1 to 4, there are preferably provided two plates 7 and 8 composed of sheet metal which coöperate with one another to form jaws for engaging a frame 9 or hood of an automobile or the like.

The jaws of the plates 7 and 8 are preferably constructed as shown, the plate 7 having two fingers 10 and 11 spaced from one another between which is located the finger 12 of the plate 8, such fingers being bent as shown to receive the frame 9 between them. The plate 7 is provided with a lug 13 to engage the orifice 14 in the plate 8. The plates 7 and 8 have openings 15 and 16 in alinement with one another, when the lug 13 engages the orifice 14 and the bent portions of the fingers 10, 11 and 12 engage a frame, to receive a screw 17 which is preferably provided with a wing nut 18 to abut against one of the plates, in the present instance, the plate 7.

The flag holder proper preferably, as shown, consists of a sheet metal plate 19 having a base portion 20 bent at right angles to the shank portion 21. Along the middle of the base portion 20 and continuing up into the shank portion 21 there is provided an elongated slot 22 to receive the screw 17. Adjacent to the end of the slot 22 nearest the outer end of the base portion 20 there is provided a lug 23 and adjacent to the other end of the slot 22 in the shank portion 21 there is provided another lug 24 to coöperate with one of the recesses 25 formed adjacent to the opening 15 in the plate 8. The other end of the shank portion 21 is preferably provided with a lip 26 composed of a portion of the plate 19 bent over upon itself and having a recess 27 at its free end and an opening 28 at its bend. As shown in Figs. 1 and 2, the lug 24 coöperates with one of the recesses 25 with the shank portion 21 engaging the face of the plate 8 and the staff or stem of the flag extending through the opening 28 into engagement with the recess 27 and there securely pinched in place. Thereupon when the wing nut 18 is tightened, the plates 19, 8 and 7 will be securely locked to one another and to the frame 9.

In Fig. 5, a modified form of flag holder plate 19′ is shown, to take the place of the plate 19, which modified plate 19′ has a plurality of openings 28′ in alinement with a like number of recesses 27′ in its lip 26′ to receive the flag stem 29 at different angles relative to the plate 19′. Furthermore, in this plate 19′, no lugs are formed at the ends of its slot 22′, to take the place of which lugs, there are provided a plurality of pimples 30 in the plate 8′ adjacent to the opening 16′ formed therein, which pimples coöperate with the slot 22′ to anchor the plate 19′ relative to the plate 8′.

It is obvious that various changes and modifications may be made to the details of construction without departing from the general spirit of the invention.

I claim:

1. A supporting device comprising two plates, jaws formed on said plates for engaging a frame to which the supporting device is to be secured, a holder adjustable relative to the plates, and a single screw for securing the plates to the frame and the holder to the plates.

2. A supporting device comprising plate members for engaging the frame to which the supporting device is to be secured, a holder having a base portion and a shank portion at an angle to one another, there being a slot formed in said base portion and extending into said shank portion, and a screw extending through said slot and said plate members for securing them to one another, the slot permitting the holder to be adjusted to different angles relative to the plate members.

3. A supporting device comprising plate members for engaging the frame to which the supporting device is to be secured, a holder having a base portion and a shank portion at right angles to one another, there being a slot formed in said base portion and continuing into said shank portion, lugs at the ends of said slots, there being recesses in one of said plate members to receive one of said lugs, and a screw for securing said holder and plate members to one another.

4. A supporting device comprising plate members for engaging the frame to which the supporting device is to be secured, a holder having a base portion and a shank portion at right angles to another, there being a slot formed in said base portion and continuing into said shank portion, lugs at the ends of said slot, a plurality of position locating means formed in one of said plate members for coöperating with said lugs to anchor said holder against lateral displacement relative to said plate members at various angles relative to said plate members, and a screw extending through said slot and through said plate members for securing said holder and plate members to one another.

WILLIAM KAHL.